US012714905B2

(12) United States Patent
Liu et al.

(10) Patent No.: US 12,714,905 B2
(45) Date of Patent: Aug. 25, 2026

(54) REHABILITATION PEDAL STRUCTURE FOR HOSPITAL BED

(71) Applicant: Chang Gung University of Science and Technology, Taoyuan City (TW)

(72) Inventors: Chiung-Mei Liu, Taoyuan City (TW); Yu-Xuan Lin, Taoyuan City (TW); Ru-Jun Lin, Taoyuan City (TW); Wan-Hsuan Lin, Taoyuan City (TW); Ya-Ping Xu, Taoyuan City (TW); Pei-Yu Chang, Taoyuan City (TW); Ying-Chien Cheng, Taoyuan City (TW)

(73) Assignee: CHANG GUNG UNIVERSITY OF SCIENCE AND TECHNOLOGY, Taoyuan City (TW)

( * ) Notice: Subject to any disclaimer, the term of this patent is extended or adjusted under 35 U.S.C. 154(b) by 2 days.

(21) Appl. No.: 18/972,573

(22) Filed: Dec. 6, 2024

(65) Prior Publication Data

US 2025/0242195 A1 Jul. 31, 2025

(30) Foreign Application Priority Data

Jan. 25, 2024 (TW) ................................ 113103148

(51) Int. Cl.

| | |
|---|---|
| ***A63B 21/00*** | (2006.01) |
| ***A61G 7/05*** | (2006.01) |
| ***A63B 23/035*** | (2006.01) |
| ***A63B 23/10*** | (2006.01) |
| ***A63B 23/16*** | (2006.01) |

(52) U.S. Cl.

CPC ........ *A63B 21/4034* (2015.10); *A61G 7/0506* (2013.01); *A63B 21/4035* (2015.10);

(Continued)

(58) Field of Classification Search

CPC .............. A63B 21/023; A63B 21/0421; A63B 21/0455; A63B 21/4034; A63B 21/4035;

(Continued)

(56) References Cited

U.S. PATENT DOCUMENTS 3,295,847 A * 1/1967 Matt, Sr. ................ A63B 22/16 482/80

3,524,643 A * 8/1970 Hazelitt, Sr. ........... A63B 22/16 482/80

(Continued)

*Primary Examiner* — Joshua Lee

(74) *Attorney, Agent, or Firm* — LANWAY IPR SERVICES; Chun-Ming Shih

(57) ABSTRACT

A rehabilitation pedal structure for a hospital bed includes a footboard, a bottom plate pivotally mounted on two sides of the footboard, and two pedals elastically and pivotally mounted on the bottom plate. The footboard is provided with a slot. The bottom plate is pivotally mounted in the slot. The two pedals can be received in the slot. Each of the pedals is electrically connected with one of two monitors, a counter, and a microcontroller. The counter performs a counting action. When the two pedals are respectively stepped or pressed by a user's two feet or hands, the two pedals swing relative to the bottom plate respectively, and the two monitors indicate a swinging number of the two pedals respectively, to facilitate detection of exercise capacity and rehabilitation times of the user's two feet or hands.

1 Claim, 5 Drawing Sheets

(52) U.S. Cl.
CPC ...... *A63B 21/4047* (2015.10); *A63B 23/0355* (2013.01); *A63B 23/10* (2013.01); *A63B 23/16* (2013.01)

(58) Field of Classification Search
CPC .......... A63B 21/4047; A63B 23/03541; A63B 23/0355; A63B 23/085; A63B 23/10; A63B 23/16; A63B 71/0622; A63B 2210/04; A63B 2210/06; A63B 2220/17; A61G 7/0506
See application file for complete search history.

(56) References Cited

U.S. PATENT DOCUMENTS

| | | | | | |
|---|---|---|---|---|---|
| 3,887,180 | A * | 6/1975 | Berman | A63B 23/04 | 5/624 |
| 7,597,656 | B2 * | 10/2009 | Trees | A63B 21/0622 | 482/142 |
| 7,744,546 | B2 * | 6/2010 | Lee | A61H 1/0237 | 601/24 |
| 8,430,796 | B1 * | 4/2013 | Tarkington | A63B 21/00189 | 482/52 |
| 9,132,051 | B2 * | 9/2015 | Heil | A61G 7/012 | |
| 9,687,401 | B2 * | 6/2017 | Alford | A61G 7/05 | |
| 10,426,998 | B1 * | 10/2019 | McRee | A63B 21/023 | |
| 10,874,567 | B2 * | 12/2020 | Zerhusen | A61G 7/005 | |
| 11,446,191 | B2 * | 9/2022 | Zerhusen | A61G 7/015 | |
| 12,005,012 | B2 * | 6/2024 | Zerhusen | A61G 7/015 | |
| 12,485,308 | B2 * | 12/2025 | Scherff | A63B 22/18 | |
| 2007/0203434 | A1 * | 8/2007 | Namgung | A63B 23/0494 | 601/24 |
| 2011/0251022 | A1 * | 10/2011 | Lee | A63B 23/0429 | 482/8 |
| 2015/0196442 | A1 * | 7/2015 | Heil | A61G 7/012 | 5/613 |
| 2017/0035638 | A1 * | 2/2017 | Koenig | G09B 5/06 | |

* cited by examiner

REHABILITATION PEDAL STRUCTURE FOR HOSPITAL BED

BACKGROUND OF THE INVENTION

Field of the Invention

The present invention relates to a pedal structure and, more particularly, to a rehabilitation pedal structure mounted on a footboard of a hospital bed.

Description of the Related Art

Although the conditions of hospitalized patients will vary depending on their symptoms, the most important thing in the healing process is exercise and rehabilitation. The patients during hospitalization are often bedridden for a long time due to their illness condition. In addition, the patient's daily activities are reduced, leading to many problems, such as muscle strength deterioration and reduced mobility. Therefore, being active more under the patient's condition will help maintain the basic physical fitness. However, rehabilitation rooms in the hospitals usually have limited equipment and space so that it is impossible for all patients to participate in exercise and rehabilitation. Therefore, most patients can only be supported by accompanying family members or caregivers to walk in the ward or on the corridor. Walking around the corridors may be dangerous, and for patients who are at higher risk of falling or who are weak (for example, patients who are overweight and unable to hold themselves steady, and whose feet are weak and unable to walk easily), the walking process is fraught with risks. Therefore, many patients will find many excuses not to exercise, and doctors cannot grasp the real situation during bed rounds. Furthermore, when doctors visually observe the activity status of the patient's limbs, since there is no detection equipment available, they can only roughly know whether the patient's hands and feet have the ability to move. Thus, it is extremely necessary for the hospital bed to add a structure with a simple rehabilitation function, to avoid a large number of patients entering and leaving the rehabilitation room. In addition, it is easier for the patients to arrange time for independent exercise and rehabilitation.

BRIEF SUMMARY OF THE INVENTION

In accordance with the present invention, there is provided a rehabilitation pedal structure for a hospital bed, comprising a footboard, a bottom plate pivotally mounted on the footboard, and two pedals elastically and pivotally mounted on two sides of the bottom plate. The footboard is provided with a slot. The bottom plate is movable relative to the footboard between an open state and a closed state. When the bottom plate is disposed at the closed state, the bottom plate closes the slot of the footboard smoothly and defines a receiving space in the footboard. A rotatable buckle is pivotally mounted on the footboard to stop the bottom plate when the bottom plate is disposed at the closed state. The bottom plate is placed on a hospital bed when the bottom plate is disposed at the open state. The two pedals are perpendicular to the bottom plate and are directed upward when the bottom plate is disposed at the open state. The two pedals are operated individually without interconnection. Each of the two pedals is electrically connected with one of two monitors, a counter, and a microcontroller. The counter performs a counting action. When the two pedals are respectively stepped or pressed by a user's two feet or hands, the two pedals swing relative to the bottom plate respectively, and the two monitors count and indicate a swinging number of the two pedals respectively, to facilitate detection of exercise capacity and rehabilitation times of the user's two feet or hands.

According to the primary advantages of the present invention, the bottom plate of the rehabilitation pedal structure is pivotally mounted on the footboard of the hospital bed. The rotatable buckle is pivotally mounted on the footboard to stop and close the bottom plate. Thus, the hospital bed is operated normally. When the patient needs to exercise or proceed in rehabilitation, the rotatable buckle is rotated to release the bottom plate, so that the bottom plate is opened relative to the footboard and is placed on the hospital bed. At this time, the two pedals are elastically returned to the original state and are directed upward. In practice, the two pedals are respectively pressed by the patient's two feet or hands to swing relative to the bottom plate. In such a manner, the two pedals are electrically connected with the counter, the microcontroller, and the two monitors, so that the two monitors indicate the count values respectively. Preferably, the counting of the counter is performed by a conventional vibration, distance or position detection component to detect the up and down swinging state of each of the two pedals. It is appreciated that the two pedals are operated individually without interconnection. In comparison, the two pedals of a conventional exercising or rehabilitation device, such as a stepper, are interconnected and cannot be operated individually, so that it is impossible to know if one side of the human body has low movement ability or has force deviation. The patient is instructed by the doctor to practice the exercise or rehabilitation actions. For example, the patient sits on the hospital bed with the two hands pushing the two pedals or lies on the hospital bed with the two feet pushing the two pedals. In addition, the patient pushes the two pedals at the same time or at different time. The two monitors indicate the count values of the two pedals respectively. Thus, the doctor can accurately determine the difference of the movement ability between the patient's two hand or feet, to facilitate immediate diagnosis or to formulate individually required exercise and rehabilitation courses, thereby greatly improving the quality of medical care.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
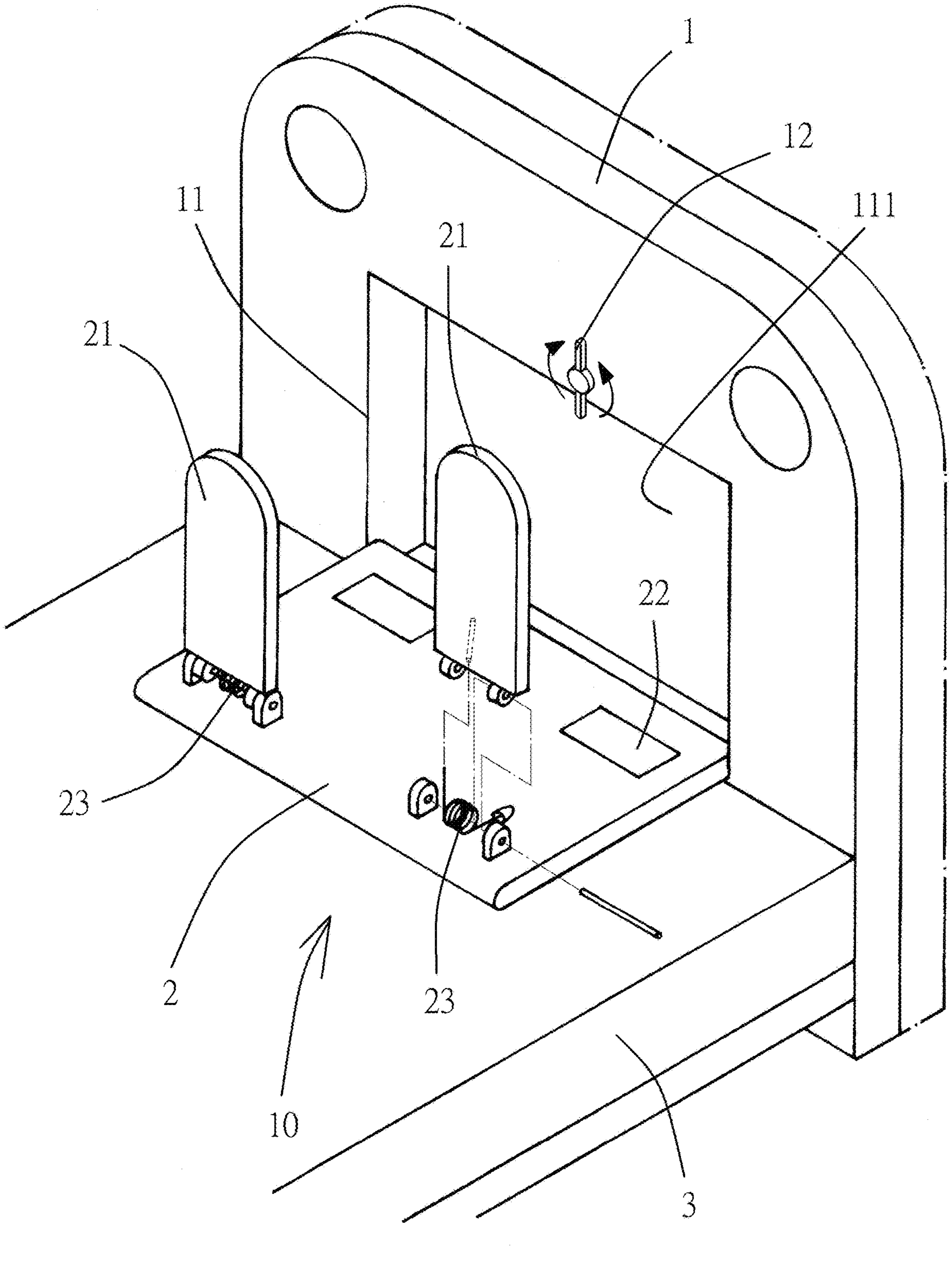
FIG. 1 is a partial exploded perspective view of a rehabilitation pedal structure for a hospital bed in accordance with the preferred embodiment of the present invention.
Figure 2:
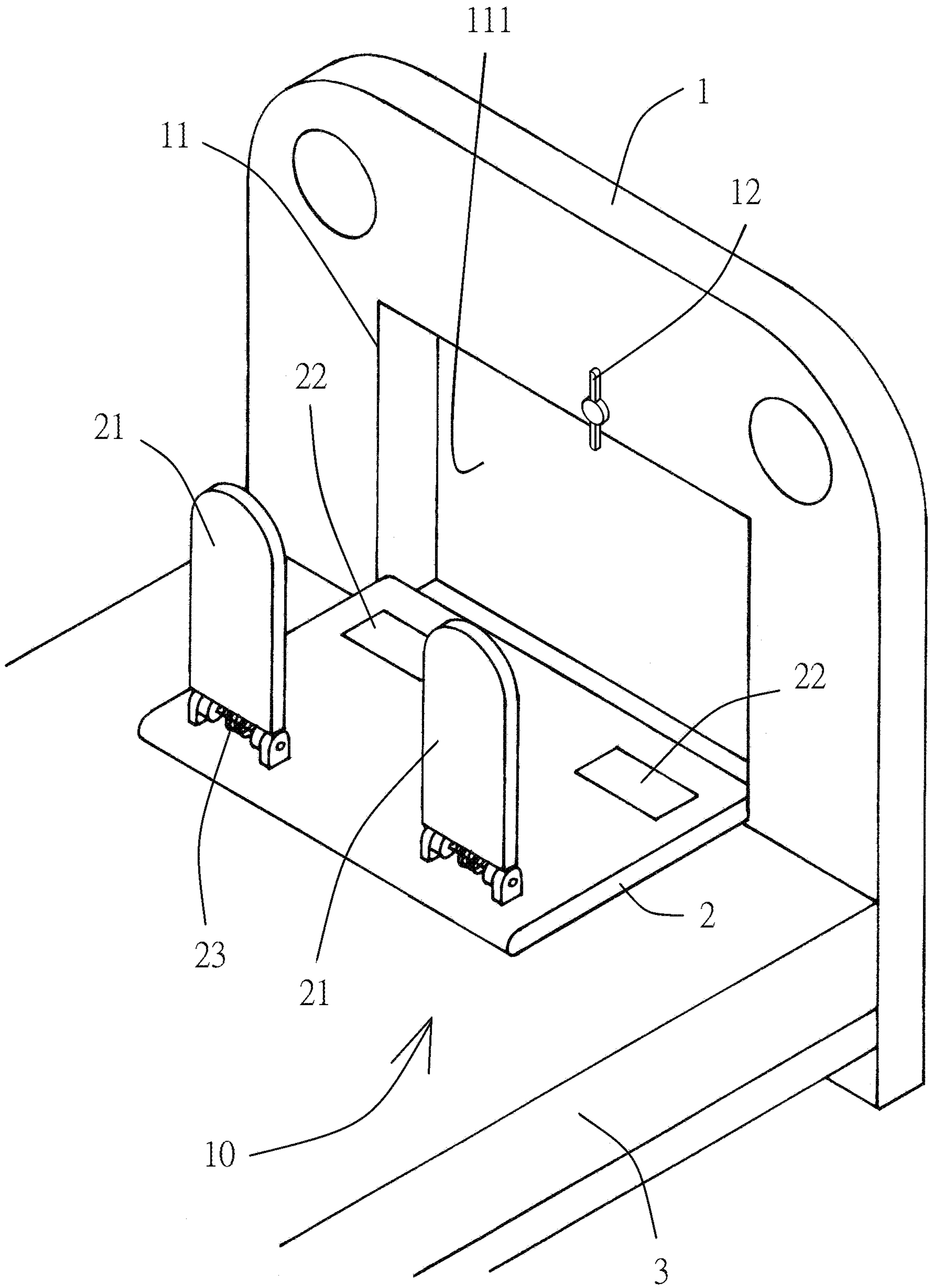
FIG. 2 is a perspective view of the rehabilitation pedal structure for a hospital bed in accordance with the preferred embodiment of the present invention.
Figure 3:
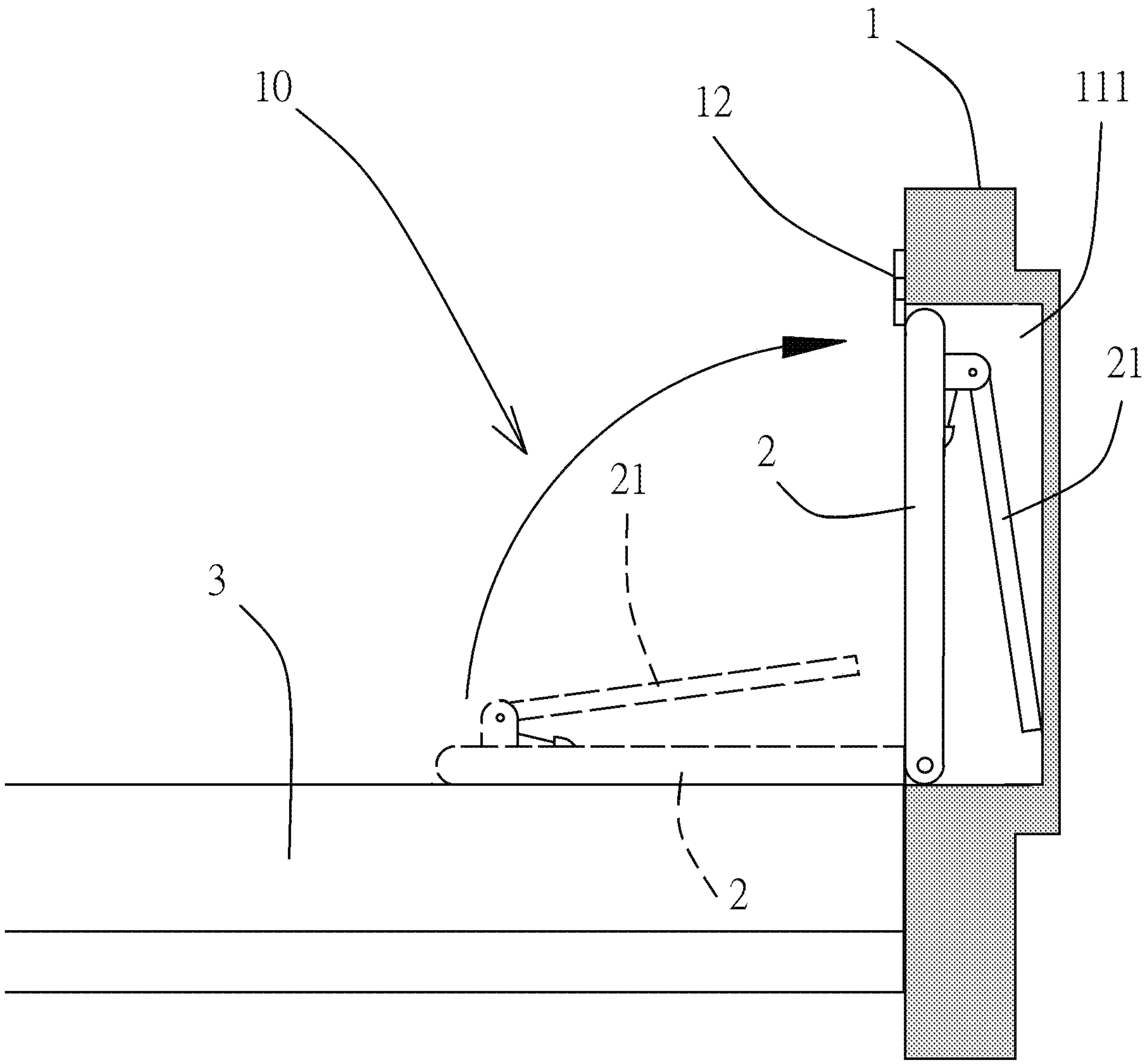
FIG. 3 is a side operational view of the rehabilitation pedal structure for a hospital bed, wherein the bottom plate is disposed at the closed state.

Referring to the drawings and initially to FIGS. 1-3, a rehabilitation pedal structure 10 for a hospital bed in accordance with the preferred embodiment of the present invention comprises a footboard 1, a bottom plate 2 pivotally mounted on the footboard 1, and two pedals 21 elastically and pivotally mounted on two sides of the bottom plate 2. The footboard 1 is provided with a slot 11. The bottom plate 2 is movable relative to the footboard 1 between an open state and a closed state. When the bottom plate 2 is disposed at the closed state, the bottom plate 2 closes the slot 11 of the footboard 1 smoothly and defines a receiving space 111 in the footboard 1. Preferably, the footboard 1 has a determined thickness to form the slot 11. A rotatable buckle (or fastener) 12 is pivotally mounted on the footboard 1 to stop the bottom plate 2 when the bottom plate 2 is disposed at the closed state. The bottom plate 2 is placed on a hospital bed 3 when the bottom plate 2 is disposed at the open state. The two pedals 21 are perpendicular to the bottom plate 2 and are directed upward when the bottom plate 2 is disposed at the open state. The two pedals 21 are operated individually without interconnection. Each of the two pedals 21 is electrically connected with one of two monitors (or displays) 22, a counter, and a microcontroller. The counter performs a counting action. Thus, when the two pedals 21 are respectively stepped or pressed by a user's two feet or hands, the two pedals 21 swing relative to the bottom plate 2 respectively, and the two monitors 22 count and indicate a swinging number of the two pedals 21 respectively, to facilitate detection of exercise capacity and rehabilitation times of the user's two feet or hands.

In the preferred embodiment of the present invention, the counting of the counter is performed by conventional vibration, distance or position detection components to detect the up and down swinging state of each of the two pedals 21. The two monitors 22 and the microcontroller are conventional and will not be described in detail. Preferably, the two monitors 22 are mounted on the bottom plate 2 and align with the two pedals 21 respectively. Alternatively, the two monitors 22 are mounted on the footboard 1.

In the preferred embodiment of the present invention, the rehabilitation pedal structure 10 further comprises two torsion springs 23 mounted on the bottom plate 2. Each of the two torsion springs 23 has a first end secured to one of the two pedals 21 and a second end secured to the bottom plate 2. Alternatively, each of the two torsion springs 23 is replaced by an elastic plate, a pneumatic bar, a spring or the like.

Figure 4:
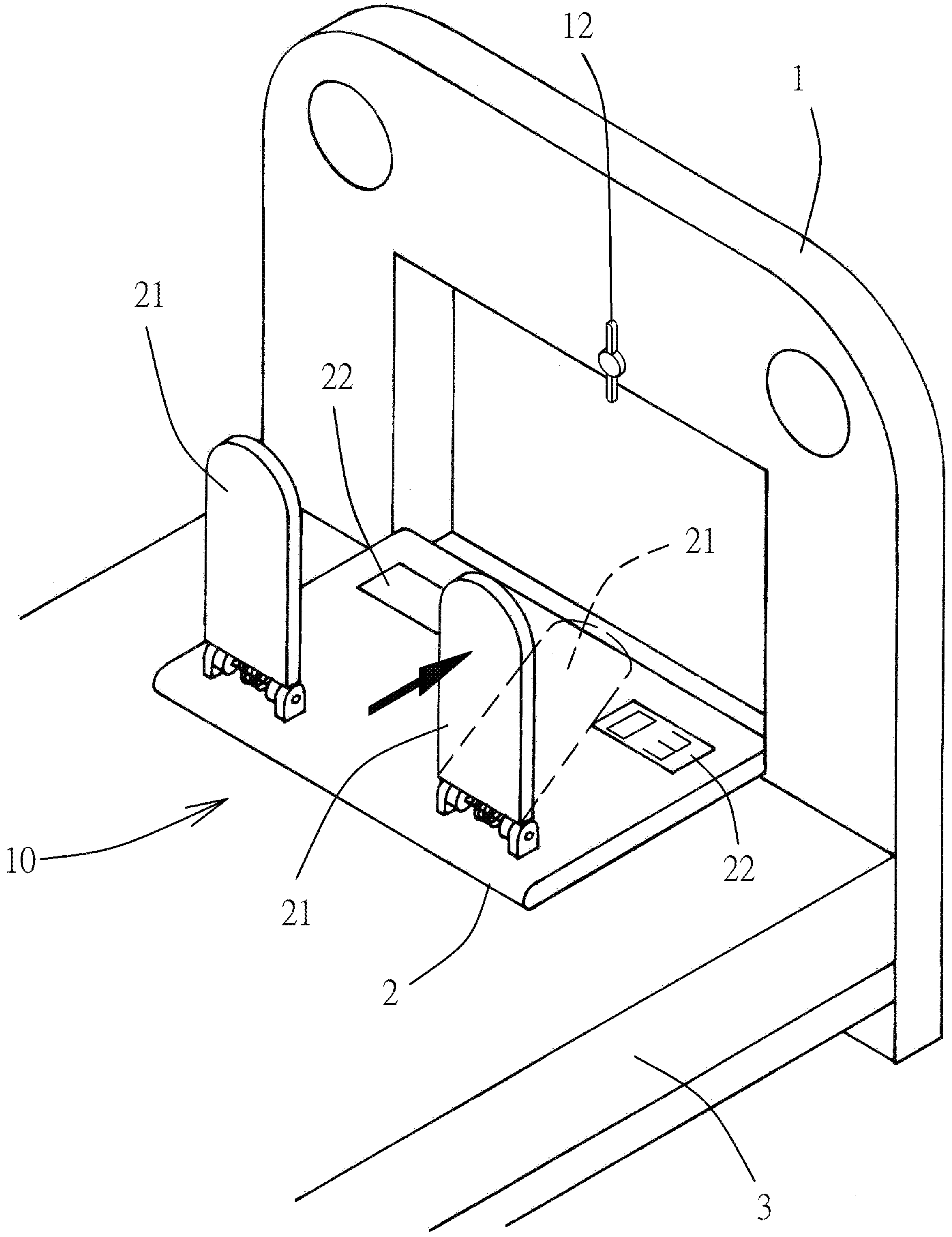
FIG. 4 is a schematic operational view of the rehabilitation pedal structure for a hospital bed as shown in FIG. 2 in use.
Figure 5:
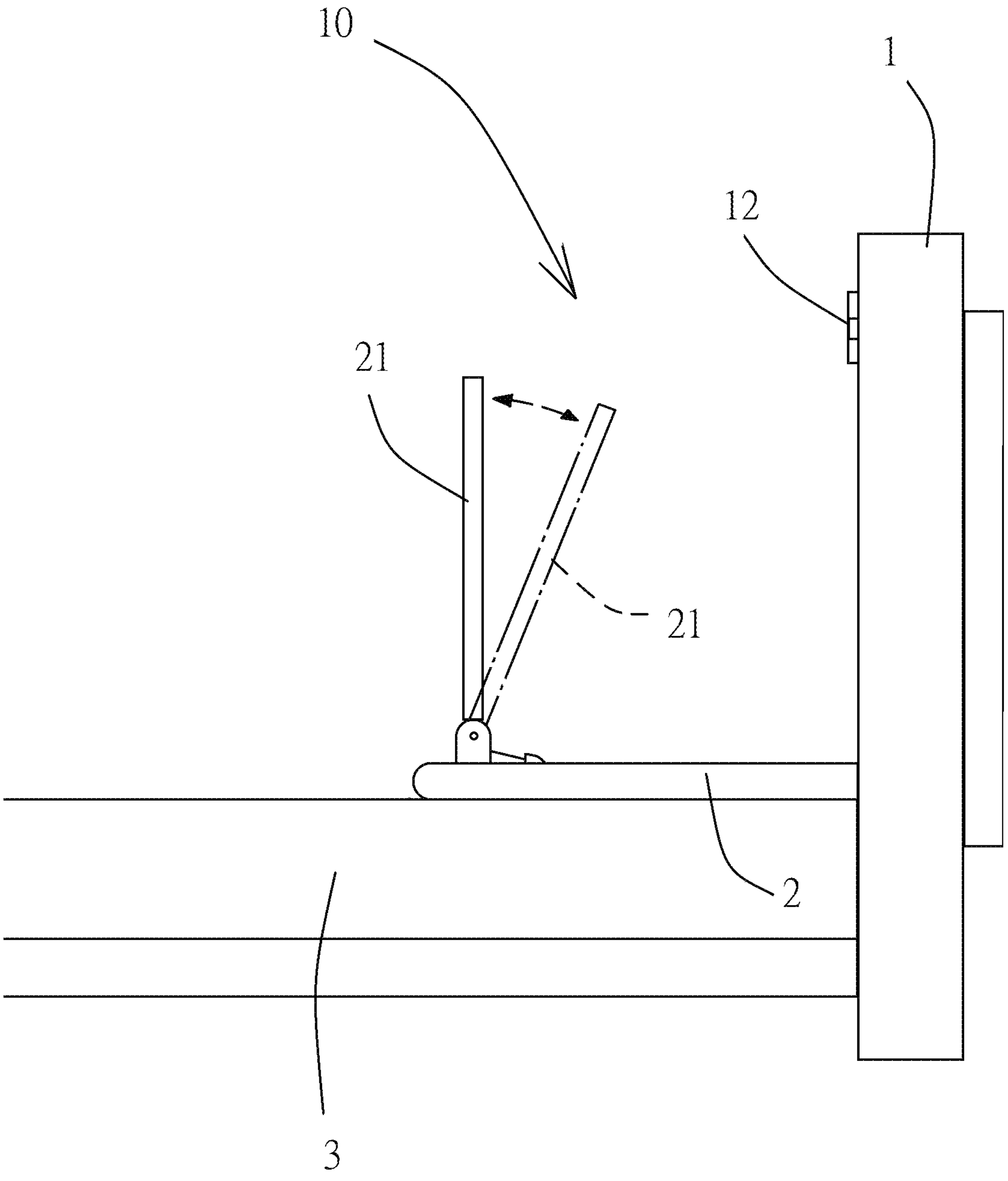
FIG. 5 is a side view of the rehabilitation pedal structure for a hospital bed as shown in FIG. 4.

In operation, referring to FIGS. 4 and 5 with reference to FIGS. 1-3, the bottom plate 2 of the rehabilitation pedal structure 10 is pivotally mounted on the footboard 1 of the hospital bed 3. The rotatable buckle 12 is pivotally mounted on the footboard 1 to stop and close the bottom plate 2 when the bottom plate 2 is disposed at the closed state. When the two pedals 21 are pivoted and folded, the two pedals 21 are fully received in the receiving space 111 as shown in FIG. 3. After the rotatable buckle 12 is rotated to release the bottom plate 2, the bottom plate 2 is pushed outward by the elastic restoring force of the two pedals 21 and is opened automatically. Thus, when the bottom plate 2 is disposed at the closed state, the two pedals 21 are hidden in the receiving space 111, so that the hospital bed 3 is operated normally. When the patient needs to exercise or perform rehabilitation, the rotatable buckle 12 is rotated to release the bottom plate 2, so that the bottom plate 2 is opened relative to the footboard 1 and is placed on the hospital bed 3 as shown in FIG. 4. At this time, the two pedals 21 are elastically returned to the original state. Thus, the two pedals 21 are perpendicular to the bottom plate 2 and are directed upward when the bottom plate 2 is disposed at the open state. In practice, the two pedals 21 are respectively pressed by the patient's two feet or hands to swing relative to the bottom plate 2 as shown in FIG. 5. In such a manner, the two pedals 21 are electrically connected with the counter, the microcontroller, and the two monitors 22, so that the two monitors 22 indicate the count values respectively. It is appreciated that, the two pedals 21 are operated individually without interconnection. In comparison, the two pedals of a conventional exercising or rehabilitation device, such as a stepper, are interconnected and cannot be operated individually, so that it is impossible to know if one side of the human body has low movement ability or has force deviation. The patient is instructed by the doctor to practice the exercise or rehabilitation actions. For example, the patient sits on the hospital bed 3 with the two hands pushing the two pedals 21 or lies on the hospital bed 3 with the two feet pushing the two pedals 21. In addition, the patient pushes the two pedals 21 at the same time or at different time. The two monitors 22 indicate the count values of the two pedals 21 respectively. At this time, the patient cannot see the values of the two monitors 22 on the bottom plate 2, to prevent the patient from lying for concealing their illness condition. Thus, the doctor can accurately determine the difference of the movement ability between the patient's two hand or feet. In addition, the values of each of the two monitors 22 have a memory function of time and can be transmitted to a specific instrument, such as mobile phone, to facilitate immediate diagnosis or formulate individually required exercise and rehabilitation courses, thereby greatly improving the quality of medical care.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

What is claimed is:

1. A rehabilitation pedal structure for a hospital bed, comprising:

a footboard;

a bottom plate pivotally mounted on the footboard; and two pedals elastically and pivotally mounted on two sides of the bottom plate;

wherein:

the footboard is provided with a slot;

the bottom plate is movable relative to the footboard between an open state and a closed state;

when the bottom plate is disposed at the closed state, the bottom plate closes the slot of the footboard smoothly and defines a receiving space in the footboard;

a rotatable buckle is pivotally mounted on the footboard to stop the bottom plate when the bottom plate is disposed at the closed state;

the bottom plate is placed on a hospital bed when the bottom plate is disposed at the open state;

the two pedals are perpendicular to the bottom plate and are directed upward when the bottom plate is disposed at the open state;

the two pedals are operated individually without interconnection;

each of the two pedals is electrically connected with one of two monitors, a counter, and a microcontroller;

the counter performs a counting action; and when the two pedals are respectively stepped or pressed by a user's two feet or hands, the two pedals swing relative to the bottom plate respectively, and the two monitors count and indicate a swinging number of the two pedals respectively, to facilitate detection of exercise capacity and rehabilitation times of the user's two feet or hands.

* * * * *